(12) United States Patent
Morikawa et al.

(10) Patent No.: US 7,060,175 B2
(45) Date of Patent: Jun. 13, 2006

(54) PRODUCING METHOD FOR OPTICAL ELEMENT MOLDING DIE AND PRODUCING METHOD FOR OPTICAL ELEMENT

(75) Inventors: Masahiro Morikawa, Hachioji (JP); Kazuo Shiozawa, Hachioji (JP); Kazumi Furuta, Hachioji (JP); Yuichi Akanabe, Tokyo (JP); Osamu Masuda, Hachioji (JP)

(73) Assignee: Konica Corporation, Tokyo (JP)

( * ) Notice: Subject to any disclaimer, the term of this patent is extended or adjusted under 35 U.S.C. 154(b) by 533 days.

(21) Appl. No.: 10/314,530

(22) Filed: Dec. 9, 2002

(65) Prior Publication Data

US 2003/0111750 A1 Jun. 19, 2003

(30) Foreign Application Priority Data

Dec. 14, 2001 (JP) ............................. 2001-381277
May 24, 2002 (JP) ............................. 2002-150103

(51) Int. Cl.
*C25D 1/00* (2006.01)
*B29D 11/00* (2006.01)
(52) U.S. Cl. ..................... 205/79; 205/70; 264/1.27; 264/2.5

(58) Field of Classification Search ............... 205/70, 205/79; 264/1.27, 2.5
See application file for complete search history.

(56) References Cited

U.S. PATENT DOCUMENTS 5,728,324 A * 3/1998 Welch et al. ............... 264/2.5
5,770,120 A * 6/1998 Kamihara et al. ........ 264/1.27

* cited by examiner

*Primary Examiner*—Edna Wong
(74) *Attorney, Agent, or Firm*—Frishauf, Holtz, Goodman & Chick, P.C.

(57) ABSTRACT

A method of producing an optical element forming die, includes the steps of: cutting a base member to form a base optical surface of the base member while rotating the base member; cutting an outer circumferential surface of the base member so that an optical axis of the base optical surface is identical to a rotation center of the outer circumferential surface of the base member while rotating the base member; forming an optical surface having a predetermined pattern onto the base optical surface of the base member; forming an electroforming mold having an optical transfer surface complementary to the optical surface of the base member by electroforming wherein the electroforming is conducted with the base member; and cutting an outer circumferential surface of the electroforming mold on the basis of the outer circumferential surface of the base member.

18 Claims, 9 Drawing Sheets

PRODUCING METHOD FOR OPTICAL ELEMENT MOLDING DIE AND PRODUCING METHOD FOR OPTICAL ELEMENT

BACKGROUND OF THE INVENTION

The present invention relates to a method of producing an optical element molding die capable of molding an optical element and a method of producing an optical element.

In recent years, there has been used an optical element such as an extremely high-precision objective lens in the field of an optical pick-up device which is growing rapidly. When a material such as plastic or glass is molded to be the optical element like that stated above by the use of a die, products in a uniform shape can be manufactured quickly, and therefore, the molding by a die can be said to be suitable for a mass production of optical elements having the aforementioned uses. Since the dies are expendables, and are estimated to be damaged by an unexpected accident in this case, replacement of dies on a periodical basis or on a non-regular basis is considered to be necessary for molding high-precision optical elements. Therefore, it is necessary to prepare in advance a certain number of dies which are precise to a certain level, for the die for molding optical elements.

When a die is made through cutting work that employs a single crystal diamond tool or the like, the cutting work is time-consuming, and it is difficult to quarry out dies which are exactly the same in terms of a shape, which causes a fear of a difference of a product shape of an optical element between before and after replacement of dies, and increases a cost, resulting in a problem.

With the foregoing as a background, there is an attempt to manufacture a die by making an electroforming mold to grow for a base that has a base optical surface corresponding to an optical surface of an optical element. When a die making method employing the electroforming of this kind is used, it is possible to obtain, relatively easily, an optical element molding die having less dimensional dispersion, only by preparing an accurate base.

In the aforementioned method, however, the base is completed through a plurality of processes starting with cutting work for a material, which requires a region that serves as a reference for a series of processing in the course of the plural processes stated above. Since a reference for a design of an optical element is generally an optical axis, it is originally preferable to provide a mark that agrees with an optical axis. However, it is impossible to provide such mark on a base optical surface, because a shape of the optical surface is damaged.

With the foregoing as a background, an optical element of a certain kind used for an optical pick-up device is provided, for an improvement of aberration characteristics, with a diffractive ring-shaped pattern which is concentric with an optical axis of an optical surface. In this case, if a ring-shaped pattern corresponding to the diffractive ring-shaped pattern is formed on a base optical surface of a base member, it is considered that a position of the optical axis can be presumed accurately when the ring-shaped pattern mentioned above is used after electroforming processing. However, detecting the optical axis from the ring-shaped pattern and conducting processing with a reference of the ring-shaped pattern thus detected require an apparatus to read the ring-shaped pattern, and they are time-consuming. Further, when the base optical surface does not have the structure which is similar to the ring-shaped pattern corresponding to the diffractive ring-shaped pattern and is concentric with the optical axis, the method mentioned above cannot be used, which is a problem.

When the aforementioned method is not used, it is difficult to specify the position of the optical axis on the base optical surface in the course of making a die, because the base optical surface is covered with an electroforming mold by electroforming in the die making method employing the electroforming. As a result, it is difficult to process accurately a part of the electroforming mold on which a shape of the base optical surface has been transferred in the processing thereafter, or a part of another die, corresponding to the optical axis mentioned above. If the electroforming mold stated above is incorporated in the die under the condition that the position of the optical axis is inaccurate, deviation of the optical axis position and deviation of the position of the shape transferred by electroforming (for example, diffractive ring-shaped pattern) are caused, which makes it impossible to attain the original optical capacity as an optical element.

SUMMARY OF THE INVENTION

The invention has been achieved in view of the problems in the prior art, and its object is to provide a base producing method capable of producing a high-precision base more easily by securing the reference for processing, an optical element molding die producing method employing the base and a method of producing an optical element that is formed by the optical element molding die.

The above object can be achieved by either one of the following aspects 1 to 3 of the present invention.

1. A method of producing an optical element forming die having the following processes including: cutting a base member to form a base optical surface of the base member while rotating the base member; cutting an outer circumferential surface of the base member so that an optical axis of the base optical surface is identical to a rotation center of the outer circumferential surface of the base member while rotating the base member; forming an optical surface having a predetermined pattern onto the base optical surface of the base member; forming an electroforming mold having an optical transfer surface complementary to the optical surface of the base member by electroforming wherein the electroforming is conducted with the base member; and cutting an outer circumferential surface of the electroforming mold on the basis of the outer circumferential surface of the base member so that the optical axis of the base optical surface is identical to a rotational center of the electroforming mold while rotating the electroforming mold together with the base member to obtain the optical element forming die having the optical transfer surface.

2. A method of producing an optical element forming die having the following processes including: mounting a base member on a first lathe; cutting a base member to form a base optical surface of the base member while rotating the base member on the first lathe; cutting an outer circumferential surface of the base member so that an optical axis of the base optical surface is identical to a rotation center of the outer circumferential surface of the base member while rotating the base member on the first lathe; removing the base member from the lathe; forming a resist layer on the base optical surface of the base member; drawing a predetermined pattern on the resist layer by radiating an electronic beam; conducting development processing to form an optical surface having the predetermined pattern onto the base optical surface of the base member; forming an electroforming mold having an optical transfer surface complementary to the optical surface of the base member by electroforming conducted with the base member; mounting the base member and the electroforming mold on a second lathe; cutting an outer circumferential surface of the electroforming mold on the basis of the outer circumferential surface of the base member so that the optical axis of the base optical surface is identical to a rotational center of the electroforming mold while rotating the electroforming mold together with the base member on the second lathe; and separating the electroforming mold from the base member to obtain the optical element forming die having the optical transfer surface.

3. A method of producing an optical element forming die having the following processes including: cutting a base member to form a base optical surface of the base member while rotating the base member; cutting an outer circumferential surface of the base member so that an optical axis of the base optical surface is identical to a rotation center of the outer circumferential surface of the base member while rotating the base member; forming an optical surface having a predetermined pattern onto the base optical surface; forming an electroforming mold having an optical transfer surface complementary to the optical surface of the base member by electroforming wherein the electroforming is conducted with the base member; combining a supporting member with the electroforming mold; cutting an outer circumferential surface of the supporting member on the basis of the outer circumferential surface of the base member so that the optical axis of the base optical surface is identical to a rotational center of the supporting member while rotating the supporting member and the base member; and separating the electroforming mold from the base member to obtain the optical element forming die having the optical transfer surface.

Since a base member made by a producing method relating to the invention is one for transferring and forming an optical element molding die through electroforming, it is necessary to fix an electrode member before electroforming processing. In this case, if a base material is fixed on the electrode member to be unified (including the case where the electrode member is covered by a layer of a base material) before forming the base optical surface, it can be utilized to guide out a reference for processing in a series of processes for producing the base member, which is a merit. When forming a base optical surface on a base material, with the foregoing as a premise, a base material is subjected to cutting processing to be cut by a diamond tool, for example, while the material is rotated. In this case, the axis of the rotation agrees with an optical axis. Therefore, if a first mark is made on the electrode member by the cutting work to be in parallel with the above-mentioned cutting processing, this first mark can be arranged to be in the same distance from the optical axis, for example, and it is possible to learn the optical axis from the first mark. However, the first mark is relatively large because it is formed by cutting work, and there is a possibility that the mark is insufficient to be the reference for the processing thereafter. Based on the first mark, therefore, a second mark that is more detailed is formed on the electrode member, and thereby, high-precision work can be conducted in the process thereafter by making the second mark to be the reference for processing.

Further, it is preferable that, after the second process, a resist layer is formed on the base optical surface, and the prescribed processing is conducted in the third process.

The base member can also be made in the following method.

A method wherein a base optical surface corresponding to an optical surface of an optical element formed by the optical element molding die is formed through cutting processing while an electrode member for electroforming is rotated, and a first mark is formed on the electrode member through cutting processing, and there are provided a fourth process for forming an outer circumferential surface of the electrode member, a fifth process for forming a second mark on the electrode member based on the first mark, a sixth process for forming a layer of a base material for forming an optical element molding die on the base optical surface formed by the fourth process, and a seventh process for applying a prescribed processing on a base material based on the second mark. This method also exhibits the same effects, and high-precision processing can be conducted. Incidentally, the fifth processing can also be conducted after the sixth processing, which is clear.

Further, it is preferable that a resist layer is formed on the base optical surface after the sixth processing, and the prescribed processing is conducted in the seventh processing, for the resist layer.

It is further preferable that the layer making is conducted by CVD method. A CVD (Chemical Vapor Deposition) method is a method wherein raw material gases representing compounds containing constituent elements of materials desired to be a thin layer or particles are supplied to the reaction section, and microscopic particles or a thin layer is made through chemical reaction in a gas phase or on the surface of a base body. The CVD method has merits that a layer forming speed is high in general, and adhesion to the base body is excellent.

The second mark can enhance a precision for processing, because if a focused ion beam is used, a fine mark whose width is as thin as 20 nm, for example, can be formed.

Further, the third or the seventh process is preferable, because a form of the base optical surface can be indicated accurately by the three-dimensional coordinates, if the eighth process determining the three-dimensional coordinates for the base material is included based on the second mark.

If the third or the seventh process includes a ninth process wherein an electronic beam is used to conduct drawing processing corresponding to a form of an optical element, processing with higher precision can be conducted, because a surface to be processed can be positioned in a narrow focus range of the electronic beam.

Incidentally, it is preferable that the drawing processing is a processing to conduct drawing for the form corresponding to a diffractive ring-shaped pattern of an optical element.

Further, if the prescribed processing is a processing to form a shape of concentric circles on the base optical surface, a fine ring-shaped pattern corresponding to the diffractive ring-shaped pattern of the optical element can be formed as, for example, concentric circles, which is preferable. However, a shape of the concentric circles is not limited to the ring-shaped pattern.

In the case of formation of a base optical surface on the base member, in which the $11^{th}$ process for making an electroforming mold to grow on the surface including a base optical surface of the base member, and a process to work upon the grown electroforming mold are included, in the invention, the base member is cut by a diamond tool, for example, while the base member is rotated. In this case, the axis of the rotation agrees with an optical axis. Therefore, if an outer circumferential surface, for example, of the base member is subjected to rotary cutting work, simultaneously with the aforementioned cutting work, the axis of the outer circumferential surface agrees accurately with the optical axis of the base optical surface. Therefore, if an outer circumferential surface of an electroforming mold (representing the base of an optical element molding die) to be grown from, for example, the base member, is processed, or if a positioning portion for an electroforming mold and a supporting member is processed, both with the processed outer circumferential surface of the base member serving as a reference, a high-precision optical element can be formed finally.

In addition, if the base member includes an electrode member for electroforming, it is not necessary to install an electrode member in the case of electroforming processing, which saves time and labor. However, the base member can also have only a material of a base member, without including an electrode member.

Further, when an optical element is formed by the use of an optical element molding die that is formed by using the above-mentioned base member, high-precision optical elements can be manufactured.

Figure 1:
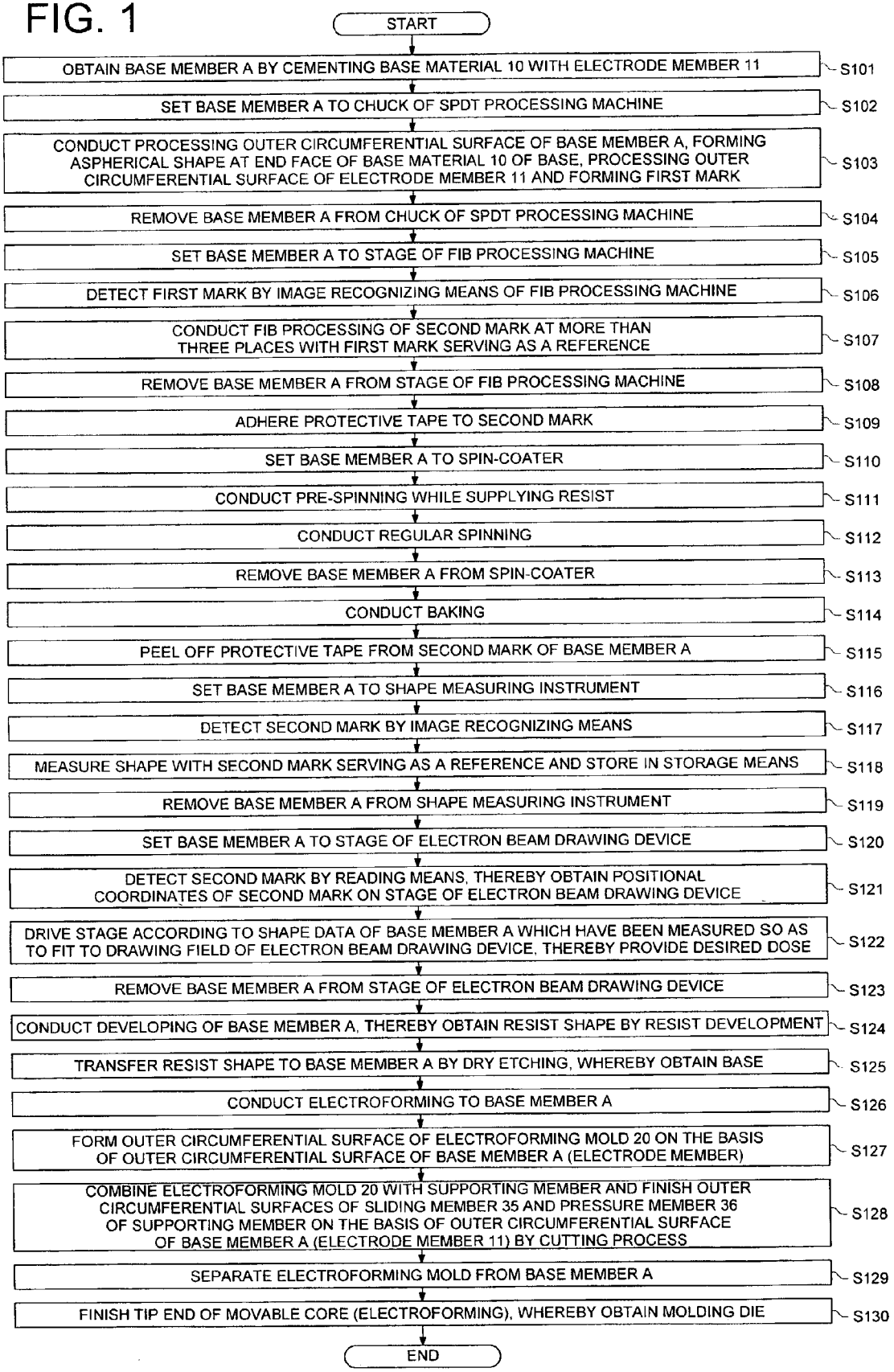
FIG. 1 is a flow chart showing processes for constituting a producing method for the die relating to the first embodiment.

Each of FIGS. 2(a)–2(g) is a sectional view showing a material a base member to be processed and an assembly of an electrode member, namely base member A, in main processes shown in FIG. 1.

Figure 3:
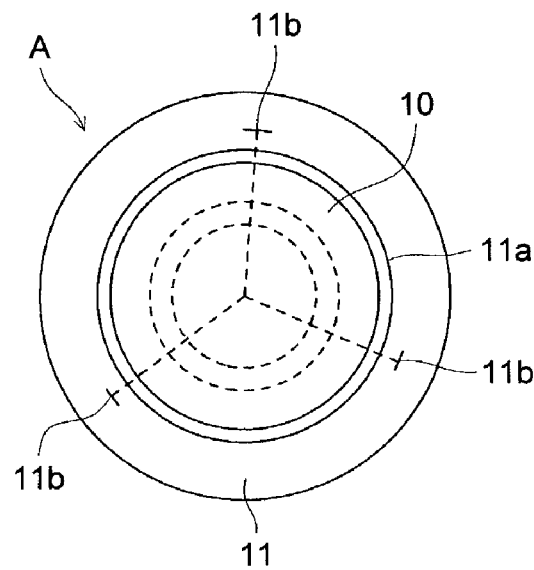

FIG. 3 is a top view of the base member A.

Figure 4:
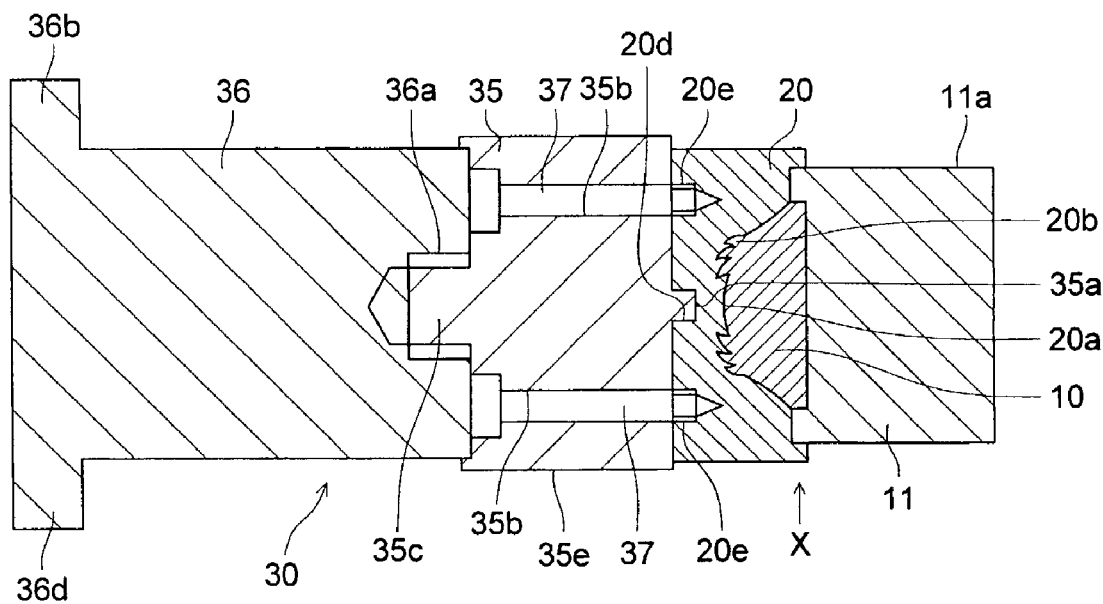

FIG. 4 is a sectional view of movable core 30.

Figure 5:
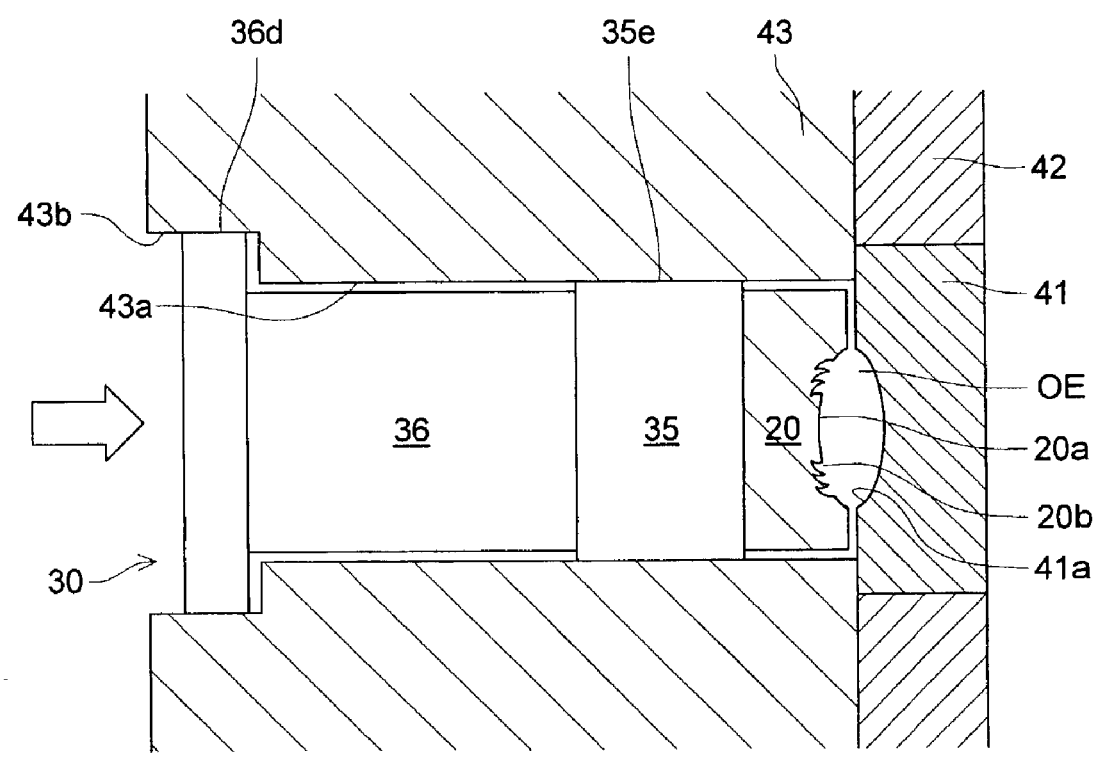

FIG. 5 is a diagram showing how an optical element is formed by the use of the movable core 30.

Figure 6:
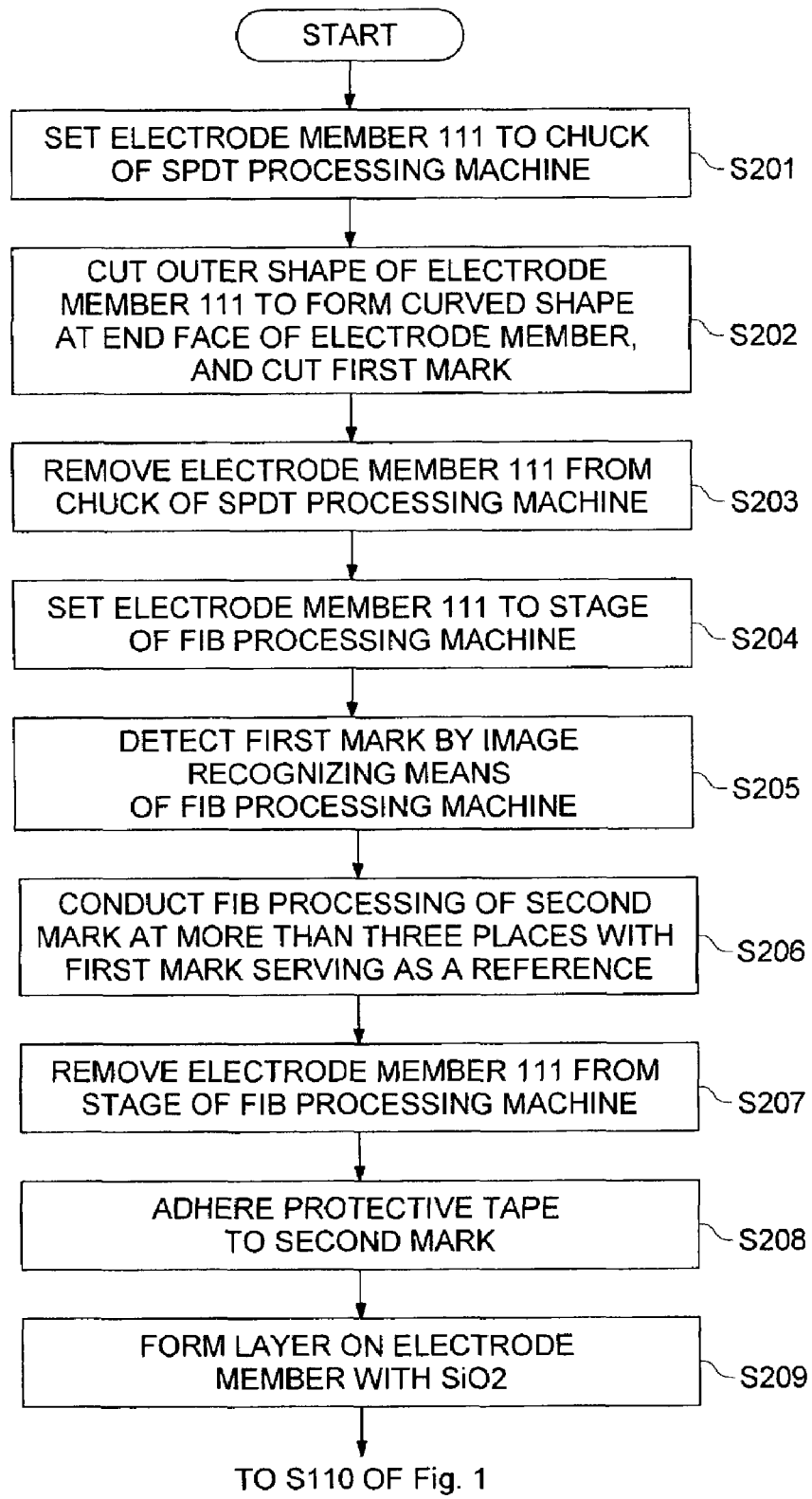

FIG. 6 is a flow chart showing processes (some processes which can be referred to FIG. 1 are omitted) constituting a producing method for a base member relating to the second embodiment.

Figure 7:
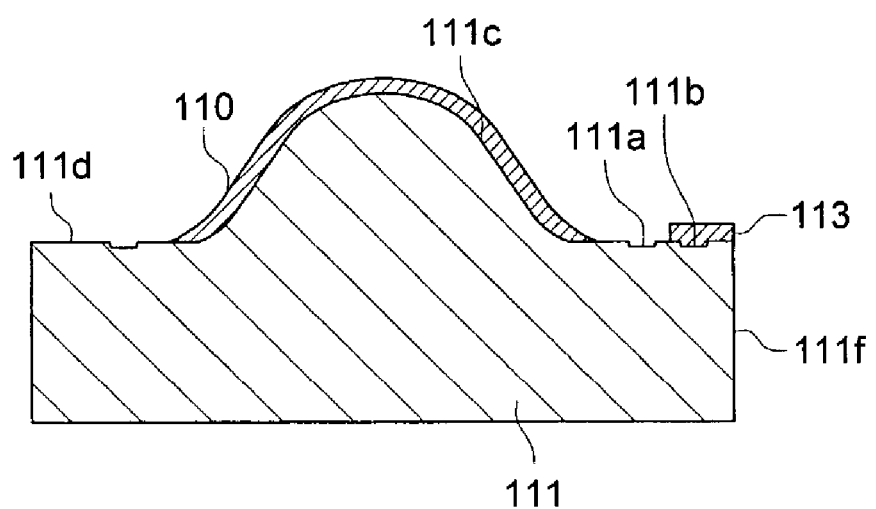

FIG. 7 is a sectional view showing a material of a base member processed by a producing method for the base member relating to the second embodiment, and an assembly of an electrode member.

FIG. 8(a) is a schematic structural diagram showing an example of the structure of a super precision lathe used for processing of base member A, and FIG. 8(b) is a perspective view showing an example of the point of a diamond tool used in the super precision lathe shown in FIG. 8(a).

Figure 9:
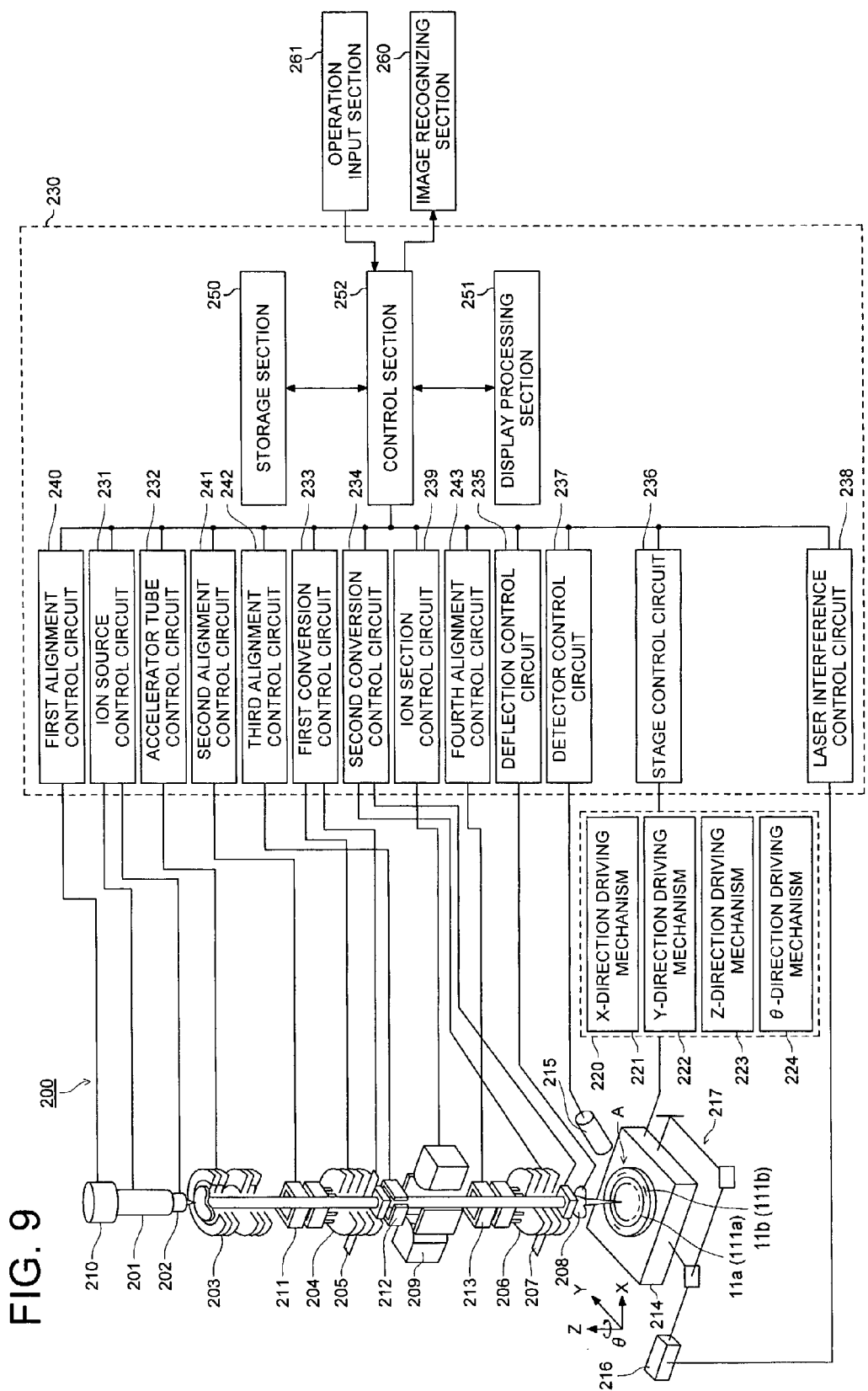

FIG. 9 is an illustration showing an example of the structure of a focused ion beam processing apparatus used for processing of base member A.

Figure 10:
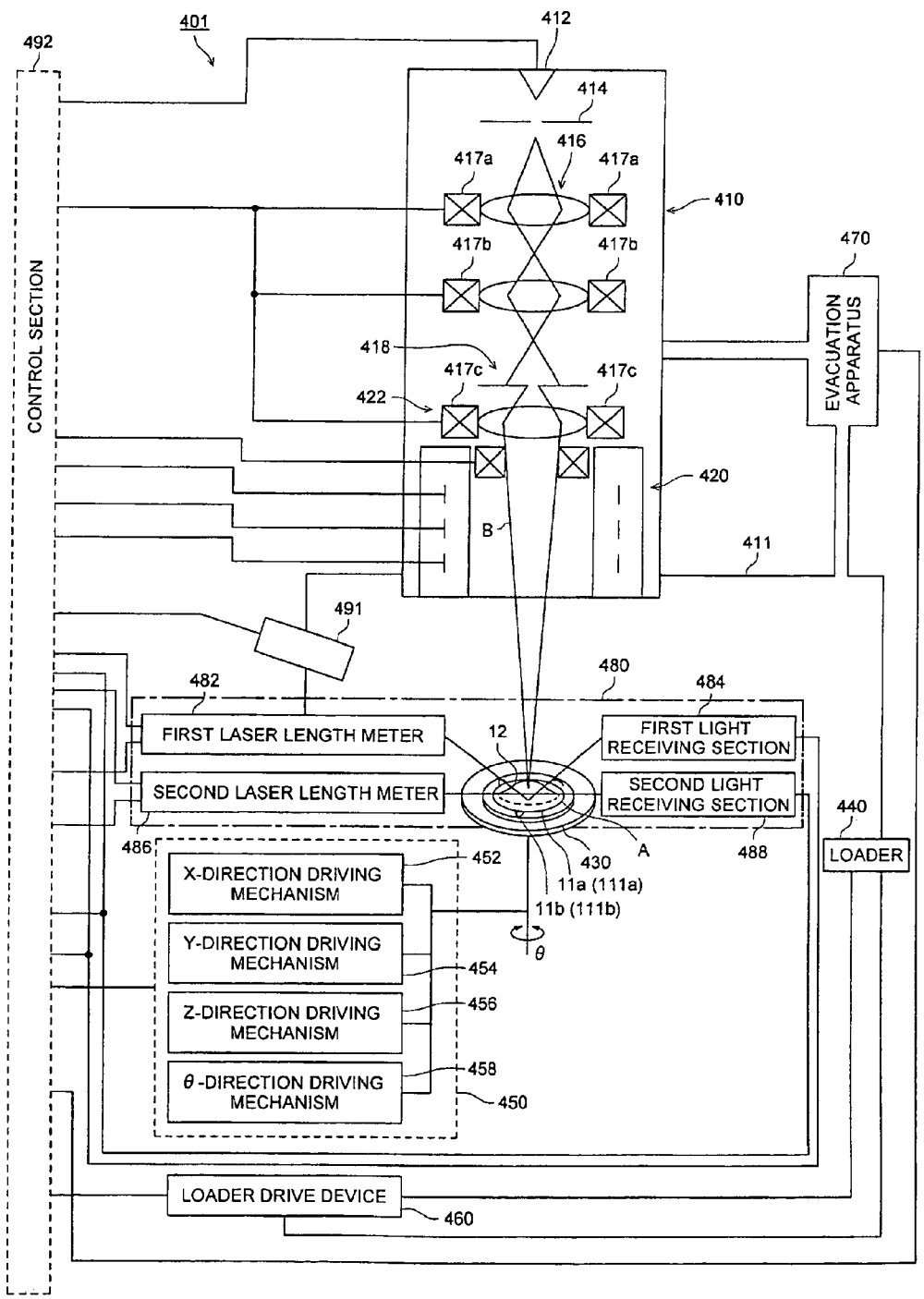

FIG. 10 is an illustration showing an example of the structure of an electron beam drawing device.

DETAILED DESCRIPTION OF THE PREFERRED EMBODIMENT

An embodiment of the invention will be explained concretely as follows, referring to the drawings. FIG. 1 is a flow chart showing processes for constituting a producing method for the die relating to the present embodiment. Each of FIGS. 2(a)–2(g) is a sectional view showing an assembly of a material of a base member to be processed and an electrode member (which is called base member A). From now on, a base member A is explained as a base member manufactured here. FIG. 3 is a top view of the base member A. Incidentally, a base member manufactured by the present embodiment is assumed to be one wherein a ring-shaped pattern corresponding to a diffractive ring-shaped pattern of an optical element is to be formed on a base optical surface of the base member.

Figure 2:
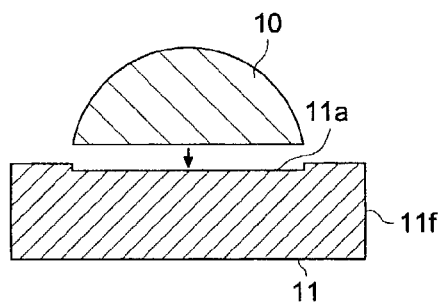
Figure 2:
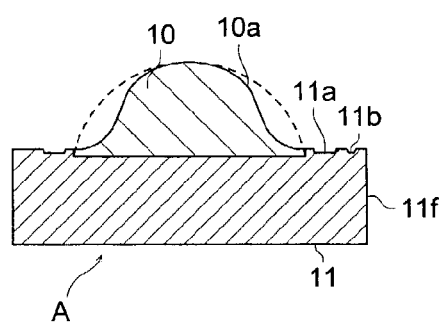
Figure 2:
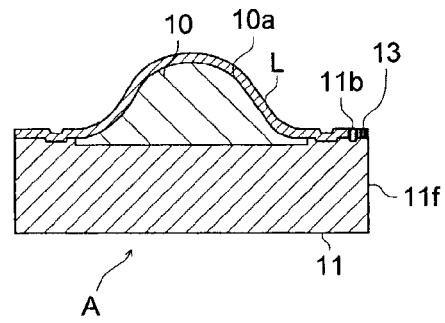
Figure 2:
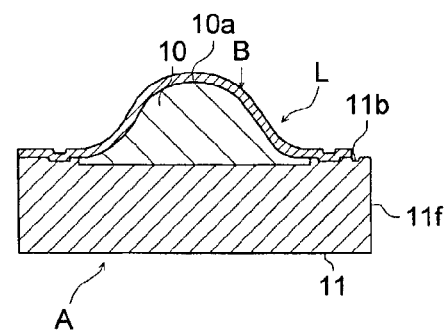
Figure 2:
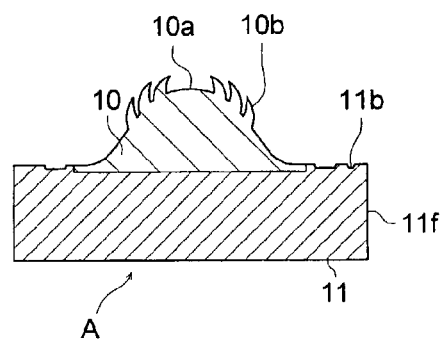
Figure 2:
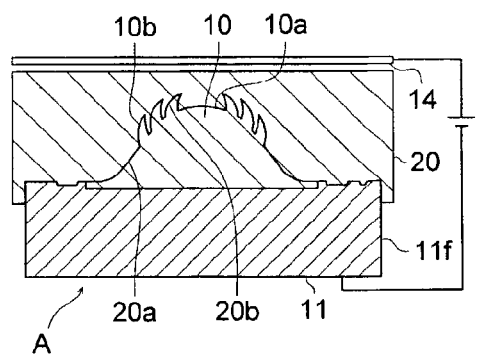
Figure 2:
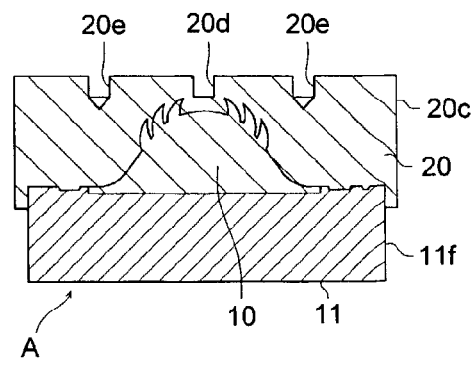

First, in step S 101 (first process) in FIG. 1, base material 10 which is made of $SiO_2$ or silicon and has a shape that is almost a hemisphere is embedded in central cavity 11a of disk-shaped electrode member 11 to be fixed with adhesives so that it may not rotate relatively (see FIG. 2(a)), thus, base member A is obtained. After that, in step S 102, the base member A is fixed on a chuck of a lathe (including a super precision lathe (SPDT processing machine) here) which will be explained in detail later. Further, in step S 103 (second process), the top face of the base material 10 is cut by a diamond tool while the base member A is rotated as shown in FIG. 2(b), to form base optical surface (corresponding to an optical curved surface of an optical element to be molded) 10a having the optical axis, and further, circular groove 11a (first mark) is formed on the top face of electrode member 11 through cutting processing, and outer circumferential surface 11f of the electrode member 11 is cut ($10^{th}$ process). In this case, a position of an optical axis of base optical surface 10a cannot be confirmed from the outer form. However, since both of them are processed simultaneously, the base optical surface 10a and the circular groove 11a are formed accurately to be concentric each other, and the outer circumferential surface 11f of electrode member 11 formed to be in a cylindrical surface is also formed to be concentric with an optical axis. The outer circumferential surface 11f has a rotation center, and is identical to the optical axis of the base optical surface.

In this case, the circular groove 11a may be formed by a plurality of grooves composed, for example, of a dark field section (corresponding to a concave portion) and a bright field section (corresponding to a convex portion), and it is more preferable that the circular groove 11a has a plurality of the dark field sections and a plurality of the bright field sections (this can be formed easily if the point of a diamond tool has a concave portion and a convex portion). In addition, the circular groove 11a can be made to function as a bank to prevent scattering of resist to be coated as described later, depending on its shape of unevenness.

Furthermore, the base member A is removed from the super precision lathe in step S 104, and is set, in step S 105, on the stage of FIB (Focused Ion Beam) processing machine described later. In succeeding step S 106, circular groove 11a on the base member A that is set on the stage of FIB processing machine is read, then, a position of an optical axis of base material 10 is determined from its inside edge, for example, and second mark 11b in quantity of three (four or more is acceptable) each being in the same distance from the determined optical axis, are drawn on electrode member 11 in step S 107 (see FIG. 2(b) and FIG. 3). Since the width of the circular groove 11a formed by a diamond tool is relatively wide, there is a fear that processing accuracy may be lowered, if the aforesaid width is used as a reference for processing. However, the FIB processing machine can form a line having a width of 20 nm, and therefore, if cross lines, for example, are formed on the machine, it is possible to form a fine marks of 20 nm×20 nm, and when this fine mark is made to be a reference for processing, higher-precision processing can be expected.

In step S 108, base member A is removed from the stage of FIB processing machine, and in step S 109, protective tape 13 is pasted on the second mark 11b (see FIG. 2(c)). The protective tape 13 is one which prevents resist L to be coated on base material 10 from being stuck on the second mark 11b in the succeeding processing. If the resist L is stuck on the second mark 11b, there is a fear that reading becomes inappropriate as a reference for processing.

Further, in step S 110, base member A is set on an unillustrated spin coater, then, and in step S 111, preliminary spin is conducted while resist L is made to flow down on base material 10, then, in step S 112, regular spin is conducted and coating of resist L is conducted (see FIG. 2(d)). The reason for dividing into preliminary spin and regular spin is to coat resist L to be uniform in thickness on base optical surface 10a that is a complicated curved surface.

After that, in step S 113, base member A is removed from the spin coater, then, in step S 114, a layer of resist L is stabilized by conducting baking, and in step S 115, protective tape 13 is peeled off. The base member A that is in that state is shown in FIG. 2(d).

Then, in step S 116, the base member A is set on an unillustrated shape measuring instrument (which has an image recognition means and a storage means), and in step S 117, the second mark 11b is detected by the use of the image recognition means of the shape measuring instrument. Further, in step S 118, three-dimensional coordinates for base optical surface 10a of base material 10 used on the super precision lathe are converted into three-dimensional coordinates based on the second mark 11b, to be stored in the storage means. The reason why the base optical surface 10a is stored again with new three-dimensional coordinates is as follows; when electron beam drawing is conducted in the succeeding process, it is necessary to adjust a relative position between an electron gun and base member A for adjusting the depth of focus of narrow electron beam for the surface to be processed on base optical surface 10a. Incidentally, the second mark 11b can be used as a position recognition mark for an operator to confirm visually the basic point of coordinates relating to measurement data in the course of measurement. Then, the base member A is removed from the shape measuring instrument, in step S119.

In step S 120, base member A is set on the three-dimensional stage of an electron beam drawing apparatus described later, then, in step S121, second mark 11b of the base member A is detected through a reading means (scanning type electron microscope: that is preferably attached to an electron beam drawing apparatus), and a shape of the surface to be processed of base optical surface 10a is obtained from the second mark 11b and from stored three dimensional coordinates of base optical surface 10a, and in step S 122, the three-dimensional stage is moved so that the electron beam may be focused for the obtained shape of the surface to be processed, then, electron beam B (see FIG. 2(d)) is radiated so that a desired ring-shaped pattern may be drawn as a prescribed processing. After drawing, in step S 123, base member A is removed from the three-dimensional stage, then, in step S 124, development processing is conducted to obtain resist in ring-shaped pattern. If the irradiation time for electron beam B at the same point is made to be long, an amount of resist to be removed corresponding to an increase of irradiation time is increased. Therefore, by adjusting the position and irradiation time (dose amount), it is possible to leave resist so that a ring-shaped pattern in a blaze form may be obtained. Incidentally, by obtaining resist in a shape of ring-shaped pattern with outer circumferential surface 11f of electrode member 11 as a reference, a ring-shaped pattern in a blaze form may also be formed on a base optical surface as described later ($13^{th}$ process).

Further, in step S 125, ring-shaped pattern 10b in a blaze form (predetermined pattern shown to be exaggerated from the actual state) is formed by engraving the surface of base optical surface 10a of base material 10 through dry etching by means of plasma shower (see FIG. 2(e)). Base member A which has been processed through the processes up to this point is manufactured as a base member. As a result of these process, an optical surface having a predetermined pattern is formed onto the base optical surface. Incidentally, in the present embodiment, the third process corresponds to steps S107, S121 and S122, the seventh process corresponds to steps S121 and S122, the eighth process corresponds to step S121 and the ninth process corresponds to step S122.

After that, in step S 126, a base member whose surface has been activated, namely, base member A is dipped in a bath of sulfamic acid nickel bath, and an electric current is made to flow between electrode member 11 and outer electrode 14, to grow electroforming mold 20 ($11^{th}$ process: see FIG. 2(f)). In this case, it is possible to control electroforming molding for the portion where insulating agents are coated, by coating insulating agents on outer circumferential surface 11f of electrode member 11 prior to electroforming. When conducting the following processing under the condition that an angle of a tilt allowed in the course of injection molding is 1 minute, it is preferable that a length in the axial direction of outer circumferential surface 11f where an electroforming mold representing its reference surface is not formed is made to be 7 mm or more. Electroforming mold 20 forms, through its growth, optical transfer surface 20a corresponding accurately to face optical surface 10a and ring-shaped pattern transfer surface 20b corresponding accurately to ring-shaped pattern 10b.

After that, in step S 127, base member A and electroforming mold 20 are chucked solidly by a chuck so that an axis of rotation of SPDT processing machine may agree with an optical axis of base member A, on the basis of the outer circumferential surface 11f of electrode member 11, and outer circumferential surface 20c of the electroforming mold 20 is subjected to cutting processing ($12^{th}$ process: see FIG. 2(g)). In this operation, the optical axis of the base optical surface is identical to a rotation center of the electroforming mold. When a length in the axial direction of the outer circumferential surface 11f is made to be 7 mm or more as stated above, it is not necessary to consider about parallelism of end faces between, for example, a supporting member (not shown) that is used when base member A is chucked and the base member A, which saves time and labor. In step S 127, SPDT processing machine (lathe) is the same as that used in step S 103. However, it is possible to use other lathe.

In addition, as shown in FIG. 2(g), hole-for-pin 20d (center) and screw hole 20e are hollowed up on electroforming mold 20 as positioning portions with a supporting member ($12^{th}$ process). Incidentally, a cylindrical shaft may also be formed in place of the hole 20d for pin.

In step S 128 (first half), movable core 30 is formed when electroforming mold 20 and a supporting member are combined solidly as described below.

FIG. 4 is a sectional view of the movable core 30. In FIG. 4, the core 30 is composed of electroforming mold 20 arranged on the tip (right side in the drawing), pressure section 36 arranged on the rear end (left side in the drawing) and sliding member 35 arranged between them. The sliding member 35 and the pressure section 36 constitute a supporting member.

Electroforming mold 20 is positioned to be in the prescribed relationship with the sliding member 35 when pin portion 35a that is protruded from the center on the end face of the sliding member 35 is engaged with the hole-for-pin 20d of the electroforming mold 20, and further, the electroforming mold 20 is fixed on the sliding member 35 when two bolts 37 passing through respectively two bolt-holes 35*b* which are running to be in parallel with an axial line are engaged respectively with two screw holes 20*e*.

The sliding member 35 is fixed on pressure section 36 to be in the prescribed relationship with it when screw shaft 35*c* that is formed to be protruded at the center on an end face (left end in the drawing) opposite to the end face (right end in the drawing) where the pin portion 35*a* is provided is engaged with screw hole 36*a* formed on an end face of the pressure section 36 which is almost cylindrical. In FIG. 4, outer circumferential surface 35*e* of the sliding member 35 is greater, in terms of a diameter, than the electroforming mold 20 and is greater than an outer circumferential surface of the portion other than flange portion 36*b* of the pressure section 36, after consideration of wear of the electroforming mold 20 in the present example. Since an outer circumferential surface of the sliding member 35 and that of the pressure section 36 are finished after cutting processing when they are rotated, on the basis of the outer circumferential surface 11*f* of electrode member 11 serving as a reference, in step S 128 in FIG. 1 (second half) so that the optical axis of the base optical surface is identical to a rotation center of the supporting member containing the sliding member 35 and the pressure section 36. In this way, the reference formed in step S 103 can be used consistently up to step S 128, and it is possible to make the coaxiality between the center of base member concentric circle pattern (ring-shaped pattern 10*b*) and the center of an external form of die sliding section to be within 1 μm.

It is also possible to finish an outer circumferential surface of the supporting member, by using a reference represented by the outer circumferential surface of the electroforming mold 20 which has be subjected to the cutting processing, after the electroforming mold 20 and the supporting member are combined in step S 128, so that the outer circumferential surface of the supporting member may become coaxial with a base member through cutting processing.

After that, the electroforming mold 20 is separated from the base member A when cutting is conducted at the position shown with arrow X in FIG. 4 (step S 129 in FIG. 1). Further, after electroforming mold 20 and a base member are separated, the electroforming mold 20 on the tip of movable core 30 is finished, and an optical element molding die is obtained.

FIG. 5 is a diagram showing how an optical element is molded by the use of movable core 30 formed in the aforesaid manner. In FIG. 5, holding section 42 that holds optical element molding die 41 having optical transfer surface 41*a* is fixed on movableside cavity 43. The movable-side cavity 43 has therein small opening 43*a* and large opening 43*b* that is coaxial with the small opening 43*a*. When the movable core 30 is inserted in the movable-side cavity 43, outer circumferential surface 35*e* of the sliding member 35 slides on an inner circumferential surface of the small opening 43*a*, and outer circumferential surface 36*d* of flange section 36*b* of pressure section 36 slides on an inner circumferential surface of the large opening 43*b*. Owing to the guide of these two sliding sections, the movable core 30 can move in the axial direction without tilting greatly on the movable-side cavity 43. Optical element OE is molded by injecting melted resin into a clearance between optical element molding die 41 and the electroforming mold 20 and by pressing the movable core 30 in the direction of an arrow mark. In the present embodiment, by using electroforming mold 20 representing an optical element molding die transferred accurately from a base member, optical transfer surface 20*a* of the electroforming mold 20 is transferred on an optical surface of optical element CEO, and a diffractive ringshaped pattern corresponding to ring-shaped pattern transfer surface 20*b* is formed accurately to be concentric with an optical axis.

Incidentally, a projection corresponding to second mark 11*b* is transferred and formed on electroforming mold 20, and therefore, if this projection is used as a reference when processing an optical element molding die in the aforesaid way, it is possible to process its outer circumferential surface accurately.

In the present embodiment, if second mark 11*b* is formed on electrode member 11 that is unified with base material 10, there is a merit that high-precision processing can be conducted on base material 10 based the second mark 11*b* in the succeeding process. Further, since outer circumferential surface 11*f* of electrode member 11 can be formed to be concentric with its optical axis by applying cutting processing on the outer circumferential surface 11*f* simultaneously with base optical surface 10*a* of the base material 10, it is possible to enhance processing accuracy in the succeeding processing (for example, processing of an outer circumferential surface of the electroforming mold 20) by making the outer circumferential surface 11*f* to be a reference surface.

Next, the second embodiment will be explained. A difference between the second embodiment and the first embodiment stated above is a construction of a base member. To be more concrete, there is prepared electrode member 111 which is in a shape similar to that of base member A shown in FIG. 1 and is made of conductive material such as metal, and a layer of $SiO_2$ or polysilicon is formed (coated) as a material of a base on convex surface 111*c* corresponding to its base optical surface (see FIG. 7). Coating of this kind is preferably conducted by CVD processing. The second embodiment will be explained more concretely.

FIG. 6 is a flow chart showing processes (some processes which can be referred to FIG. 1 are omitted) constituting a producing method of a base member relating to the second embodiment. In FIG. 6, electrode member 111 is clamped in a chuck on a super precision lathe (SPDT processing machine) in step S 201. Further, in step S 202 (fourth process), convex surface 111*c* is cut by a diamond tool while the electrode member 111 is rotated to form a base optical surface (corresponding to an optical surface of an optical element to be formed finally), and further, circular groove 111*a* (first mark) is formed on the circumferential surface of electrode member 111 through cutting processing, and outer circumferential surface 111*f* is cut ($10^{th}$ process). In this case, a position of an optical axis of base optical surface cannot be confirmed from the outer form. However, since both of them are processed simultaneously, the base optical surface and the circular groove 111*a* and outer circumferential surface 111*f* are formed accurately to be coaxial each other.

Furthermore, the electrode member 111 is removed from the super precision lathe in step S 203, and is set, in step S 204, on the stage of FIB processing machine. In succeeding step S 205, circular groove 111*a* on the electrode member on the stage of FIB processing machine is read, then, a position of an optical axis of the optical surface is determined from its inside edge, for example, and second marks 111*b* in quantity of three (four or more is acceptable) each being in the same distance from the determined optical axis, are drawn on the circumferential surface 111*c* of the electrode member 111 in step S 206 (fifth process).

The electrode member 111 is removed from FIB processing machine in step S 207, and protective tape 113 (see FIG.

7) is pasted on the second mark 111*b* in step S 208. This tape 113 is one for preventing that a layer is formed up to the second mark 111*b* when forming a layer on material 110 of a base member, and for preventing that the resist to be coated on material 110 of a base member coated with a layer in the succeeding processing is stuck on the second mark 111*b*. If the layer or the resist is stuck to the second mark 111*b*, there is a fear that reading is inappropriate as a reference for processing. After that, in step S 209 (6*th* process), material 110 of a base member is coated on electrode member 111 through CVD processing, then, coated electrode member 111 is set on a spin coater as base member A so that processes from S 110 and thereafter in FIG. 1 are executed and a die is manufactured.

Each of the second marks 11*b* and 111*b* used in the present embodiment has a shape which is almost a cross, and as shown in FIG. 3, for example, the cross is composed of a parallel line that is formed to be almost in parallel with the first mark 11*a* and an orthogonal line that intersects with the parallel line almost at right angles (or it has only to cross without intersecting at right angles). Due to this, accuracy of recognition of second marks 11*b* and 111*b* for recognizing positions can be improved, and it is possible to improve positioning accuracy on exposure apparatuses for the respective processes and electron beam drawing apparatuses. Incidentally, it is preferable that each of the second marks 11*b* and 111*b* is arranged to be formed at the position which is farther by a distance that is at least about three times the effective diameter of an effective curved surface section. Further, though there has been given an example wherein each of the second marks 11*b* and 111*b* is formed by engraving to be a recessed portion in a concave shape, the invention is not limited to the foregoing, and it is possible to structure with a convex portion having a section in a convex shape. In that case, protective tape 13 is not needed because the position for the succeeding process can be recognized by a mark in a convex shape, even if the surface of the circumferential face is covered with resist L.

Further, each of the second marks 11*b* and 111*b* may also have a line such as a curved line that is in parallel with concentric circles representing circular grooves 11*a* and 111*a*, or, it may be a cross wherein two straight lines cross each other, without being limited to the former, because the cross can easily be recognized by human eyes. In addition, without being limited to the shape of the cross wherein two lines cross at right angles, the mark may be either a cross wherein two lines just cross each other, or other various shapes such as, for example, a circle and a triangle. However, a shape having an edge or a corner is preferable because it is easy to specify a point, and in other cases which are different from the foregoing, on the other hand, it is preferable to measure shapes of the second marks 11*b* and 111*b* and thereby to determine its central position.

Further, each of the second marks 11*b* and 111*b* may also be a cross wherein one line is longer than the other, in addition to a cross wherein two crossing lines are the same in terms of a length. Owing to this, a mark can be recognized easily. Or, it is possible to employ the structure wherein a cross is formed by depositing a thin layer composed of carbon evaporated on base member A. By providing an area in a square shape as in the foregoing, it is possible to make the structure to be recognized more easily. Incidentally, any other shapes can be used without being limited to the square shape, provided that the shape has an area, or the shape has contours.

It is possible to form the second marks 11*b* and 111*b* from carbon, and further to form with only a point in place of a cross. When forming carbon through evaporation as stated above, optional shapes can be structured without being limited to a cross, because an edge effect of a boundary line makes the boundary line and a point to be recognized visually and clearly.

(Super Precision Lathe: SPDT Processing Machine)

The schematic structure of a control system of a super precision lathe used in cutting processing for base member A, for example, of SPDT (Single Point Diamond Turning) will be explained as follows, referring to FIGS. 8(*a*) and 8(*b*).

Figure 8:
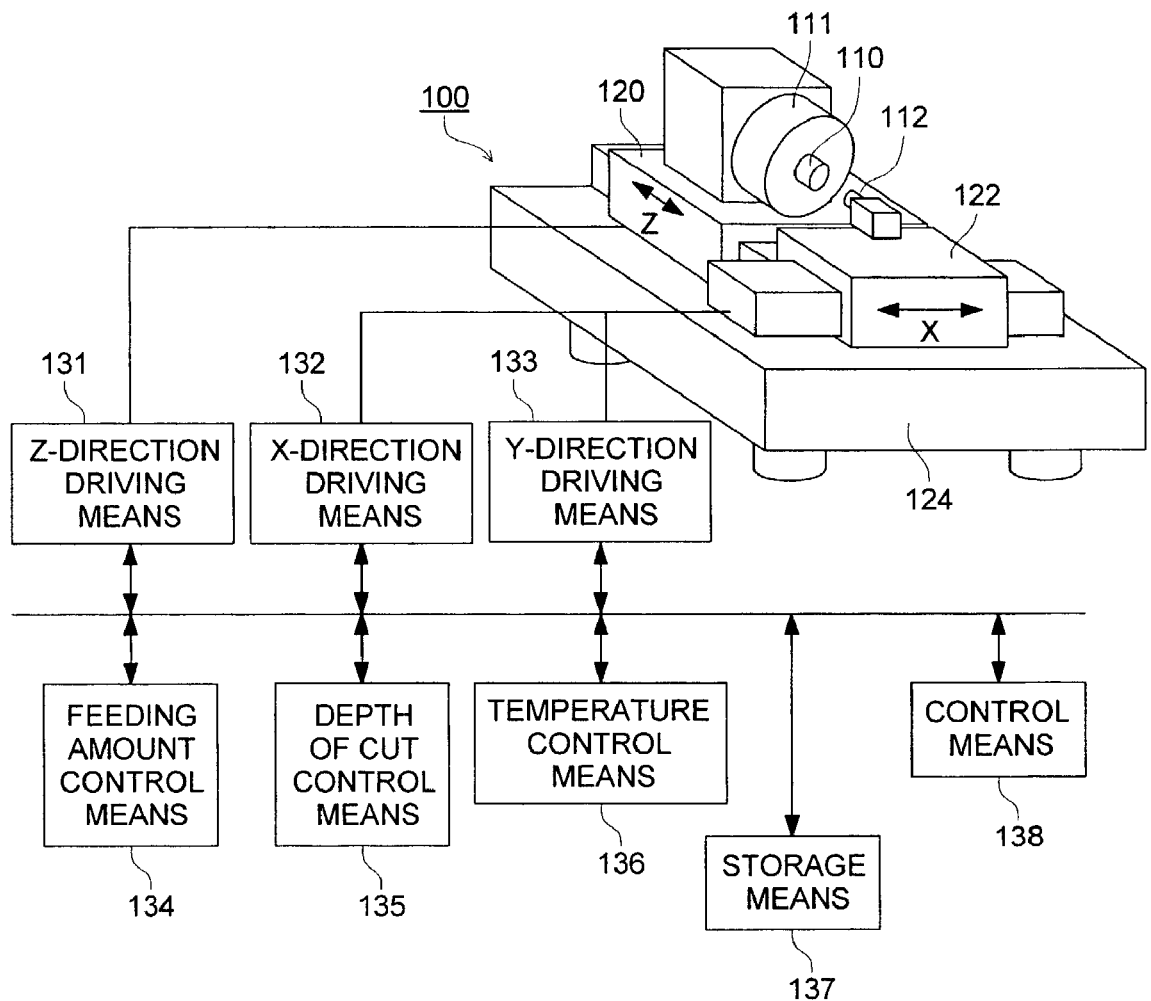
Figure 8:
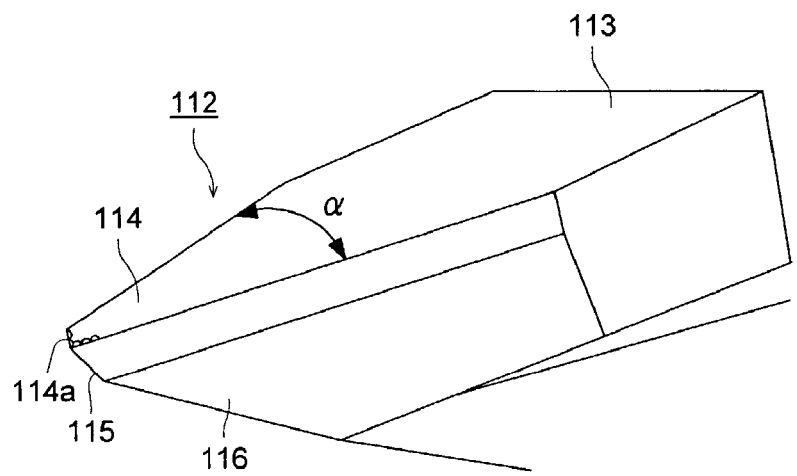

As shown in FIG. 8(*a*), super precision lathe 100 is composed of holding section 111 representing a rotary holding member for fixing work piece 110 such as base member A, diamond tool 112 representing the cutting edge of a cutting tool 112 for processing the work piece 110, Z-axis slide table 120 for moving the holding section 111 in the Z-axis direction, X-axis slide table 122 that moves the diamond tool 112 in the X-axis direction (or, also in the Y-axis direction) while holding it, and surface plate 124 that holds Z-axis slide table 120 and X-axis slide table 122 while allowing them to move freely. Incidentally, an unillustrated rotation drive means for driving to rotate either one or both of the holding section 111 and the diamond tool 112 is provided to be connected electrically to control means 138 which will be described later.

As shown in FIG. 8(*a*), super precision lathe 100 is composed of Z-direction driving means 131 that controls driving of the Z-axis slide table 120, X-direction driving means 132 and Y-direction driving means 133 which control driving of the X-axis slide table 122 (or, also driving in the Y-axis direction), feeding amount control means 134 for controlling a feeding amount by the aforesaid driving means, depth of cut control means 135 for controlling a depth of cut, temperature control means 136 for controlling temperatures, storage means 137 in which various control conditions, control tables or processing programs are stored and control means that controls the respective sections stated above.

As shown in FIG. 8(*b*), the diamond tool 112 is composed of diamond tip 113 constituting the main body section, rake face 14 that is formed on the tip portion of the tip to have apex angle α, first flank 115 constituting a side portion and second flank 116. A plurality of irregularity portions 114*a* are formed on the cutting edge included in the rake face 114 in advance, or, they are caused through abrasion.

Rough operations of the super precision lathe 100 having the structure mentioned above are as follows. Namely, the diamond tool 112 moves relatively to work piece 110 representing the fixed base member A to process the work piece. In this case, a position of the point of the diamond tool 112 where the cutting edge touches the work piece is shifted gradually along the rounded form of the cutting edge, resulting in high wear resistance of the tool accordingly.

In the present embodiment, when processing the base member A by the used of the super precision lathe like that stated above, a curved surface portion is cut through cutting processing by controlling a feeding amount and a depth of cut while conducting temperature control.

(Focused Ion Beam (FIB) Processing Machine)

(Explanation on Structure)

Next, the schematic structure of a focused ion beam processing machine for forming the second marks 11*b* and 111*b* will be explained as follows, referring to FIG. 9.

The focused ion beam processing machine (FIB: Focused Ion Beam machine) is one that conducts processing of base member A by focused ion beam employing an ion source of metal such as Ga, and conducts observation of scanned image (SIM: Scanning Ion Microscope) obtained by scanning base member A with a focused ion beam, and it converges an ion beam emitted from the ion source and accelerated finely with a condenser lens and an objective lens, to irradiate on the base member A, then, scans, with a deflector, a point on the base member A irradiated with an ion beam and detects secondary electrons generated from the base member A through scanning, for example, to display the scanned image based on the detection signals.

Focused ion beam processing machine 200 is kept to be highly vacuous, and it is composed of liquid metal ion source 201 representing an ion source, drawing out electrode 202 that draws ion, acceleration tube 203 that accelerates an ion beam to desired energy and is composed of plural steps, condenser lens 204 whose opening can be changed by aperture 205 that regulates the ion beam, objective lens 206 which can adjust its opening by aperture 207 and irradiates a sample by focuses an ion beam, deflector 208, E×B mass analyzer 209 equipped with a blanking/E×B restriction aperture, emitter alignment 210, alignment set stigmata 211, alignment set 212, alignment set stigmata 213, stage 214 on which base member A to be processed is placed to be adjusted freely in terms of position and inclination, detector 215 for detecting a position recognition mark, laser interferometer 217 composed of laser supply source 216 and an optical system, stage driving means 220 to drive stage 214, control circuit 230 to control the above-mentioned respective sections, operation input section 261 for inputting operations, image recognition section 260 for observing and recognizing base member A and scanned images and an unillustrated power supply.

Each of apertures 205 and 207 has, for example, an opening which can change an ion beam diameter by regulating a path for the ion beam, and has a thickness through which the ion beam cannot pass on an area other than the opening. Incidentally, the aperture may also be formed to be N steps.

The detector 215 is one to detect, for example, secondary electrons generated based on irradiation of the ion beam on base member A.

The stage driving means 220 is composed of X-direction driving mechanism 221 for driving the stage in the X-direction, a Y-direction driving mechanism for driving in the Y-direction, a Z-direction driving mechanism for driving in the Z-direction, and a θ-direction driving mechanism for driving in the θ-direction.

The control circuit 230 is composed of ion source control circuit 231 that controls ion source 201, acceleration tube control circuit 232 that controls acceleration tube 203, first conversion control circuit 233 that controls conversion by condenser lens 204, second conversion control circuit 234 that controls conversion by objective lens 206, deflection control circuit 235 that controls a deflector of deflector 208, stage control circuit 236 that controls stage driving means 220, detector control circuit 237 that controls processing of signals from detector 21 that detects secondary ion generated on base member A, laser interferometer control circuit 238 that controls laser interferometer 217, ion selection control means 239 that selects ion by controlling E×B mass analyzer 209, first-fourth alignment control circuits 240, 241, 242 and 243 which control respectively emitter alignment 210, alignment set stigmata 212, and alignment set stigmata 213, storage section 250 housing therein various control tables and programs, display processing section 251 that displays various display images and control section 252 such as CPU that controls the foregoing.

The storage section 250 is realized as an area of a storage device such as, for example, a semiconductor memory or a disk device, and it stores a combination of image data and positional data. For example, it can store positional data composed of positional coordinates on a section and sectional image data wherein pixels constituting each sectional image data are housed in the order of scanning, as paired data. In the storage section 250, there are provided a plurality of areas each storing the aforementioned data, and the aforesaid data which are formed on a specific location of base member A and correspond to each section can be housed in the area after being arranged in the order of positional data.

For displaying the specific location, the display processing section 251 processes so that images, for example, are displayed on image recognition section 260 based on each image data and positional data accumulated in the storage section 250. Incidentally, it is also possible to arrange so that the display processing section 251 may read data of pixels of optional X, Y and Z coordinates from data stored in the storage section 250, and may display three-dimensional images viewed from a desired viewpoint on the image recognition section 260. Though various methods are considered as a display method, it is preferable, for example, to extract contours from adjoining pixel data, then, further to judge context of the contours, and thereby to display hidden portions with broken lines. Further, it is possible to conduct image processing such as contour extraction by changes of luminance for the image data, and to recognize a size and a position of a distinctive portion on the surface of base member A such as a hole and a line formed by ion beam, and to judge whether the base member A is arranged at the desired position on stage 214 or not, or whether a hole or a line in a desired size is formed by ion beam on the base member A or not.

The control section 252 receives detection signals from the detector 215 through detector control circuit 237, for example, and forms image data and establishes various conditions on each section based on instructions of operation input section 261 or on image data. It can further control stage 214 and each section to be irradiated by ion beam, in accordance with instructions of operators inputted from the operation input section 261.

Further, the control section 252 receives all detection signals from detector 215 which have been converted into digital values by means of the detector control circuit 237. The detection signals vary depending on the position where a ion beam is scanning, namely, depending on the direction of deflection of the ion beam. Therefore, it is possible to detect the surface shape and materials of base member A in each scanning position of the ion beam, by synchronizing the direction of deflection with the detection signals. The control section 252 can display image data on the surface of base member A on image recognition section 260 by constituting the foregoing again corresponding to the scanning positions.

(Explanation of Operations)

In focused ion beam processing machine 200 having the aforesaid structure, base member A on which base optical surface 10 and first marks 11b and 111b are formed all over is set on stage 214 that is provided on the focused ion beam processing machine 200 first, then, surroundings are made to be vacuous, and the focused ion beam processing machine 200 is set up to the level where the ion beam can scan the base member A.

Then, a certain area on the base member A is scanned by the ion beam. In this case, ion from ion source 201 is generated at the drawing out voltage of 5–10 kV, and it is accelerated by acceleration tube 203. The accelerated ion beam is converged by condenser lens 204 and objective lens 206, and it arrives at base member A on stage 214.

Incidentally, when using an alloy ion source such as Au-Si-Be, necessary ion only is made to advance straight and a path of unwanted ion is deflected, both by E×B mass analyzer 209 so that the necessary ion can be separated and selected.

When handling an ion wherein an isotope is present, it is preferable that a crossover point of an ion beam by condenser lens 204 is adjusted and controlled so that it may come to the center of E×B mass analyzer 209. Due to this, the isotope can be utilized effectively without being separated. Thus, the ions are converged to a point on base member A by objective lens 206 to be capable of scanning in a form, for example, of a raster.

A secondary electron and a secondary ion emitted from the surface of base member A are detected by scanning, and based on the results of the detection, image processing is conducted by display processing section 251, and SIM image showing a surface form of the area is displayed on image recognition section 260. For example, positioning of stage 214 is conducted so that SIM image may be displayed each time the stage 214 is moved, and a specific portion may be displayed.

For example, it is recommendable for an operator to specify, by using operation input section 261, a processing area, processing time and a value of an electric current of an ion beam as, for example, the establishment of processing conditions, for SIM image indicating the specific portion. For example, SIM image on the surface of base member A is obtained, and further, a processing area is established for the specific portion, and processing time for the processing area, an ion beam diameter of an ion beam used for processing and a value of an electric current are specified. Incidentally, it is also possible to observe the state of the base member A by using another observation optical system that is not shown.

In the present embodiment, the image recognition section 260 is made to recognize first marks 11a and 111a on base member A, based on detection signals from detector 215.

Then, a parallel line that is in parallel with lines of the first marks 11a and 111a is formed by an ion beam. In this case, it is preferable that the parallel line is formed to be a part of an arc by relative movement between the stage 214 and an ion beam, or it is formed to be a straight line.

In this case, focused ion beam processing machine 200 scans the aforementioned processing area. Since an amount of sputtering is determined depending on material of base member A, a type (difference of an electric current amount of ion beam) and energy of an ion beam and an amount of dose, the processing area can be engraved to an almost fixed depth by a single scanning. Further, it is possible to store all detection signals of secondary electrons and secondary ions in storage section 250, then, to acquire image data at the specific portion, and to obtain an image at an optional position in accordance with instructions of an operator, corresponding to the scanning.

Then, orthogonal lines which intersect the parallel line approximately at right angles are formed by an ion beam. By forming these orthogonal lines at plural locations, for example, at three locations in the direction along circumferences of concentric circles of the first marks 11a and 111a, a plurality of second marks 11b and 111b can be formed.

Incidentally, as forming procedures in the case of forming the second marks 11b and 111b at three locations, it is also possible to arrange to form parallel lines at three locations by rotating stage 214 intermittently in advance, and then, to form orthogonal lines at respective locations, without being limited to the aforesaid method.

Further, it is preferable to employ an arrangement wherein the control procedures in the foregoing are stored in storage section 250 as control programs in advance, and from operation input section 261, "3" is inputted when second marks 11b and 111b are formed at three locations and "5" is inputted when second marks 11b and 111b are formed at five locations, and thereby, first marks 11a and 111a are detected automatically to calculate automatically the point for forming the second marks 11b and 111b, thus, the second marks 11b and 111b are formed automatically when an execution start button is pressed.

By using a focused ion beam apparatus as stated above, an observation optical system of the focused ion beam apparatus and second ion images are used to observe, and the first marks are recognized to learn coordinates at a stage position of the focused ion beam apparatus. It is possible to form the second marks by scanning with a focused ion beam at the position of the coordinates.

In this case, a width of a line (convergence of a beam) preferably is, for example, about 1 nm–about 50 nm, which, however, is limited to the occasion where Ga ion is applied. More preferable is about 20 nm. Deviation of a central axis of an optical element needs to be within 1 µm, because it is possible to determine a position for this 1 µm with a sufficiently small diameter.

Incidentally, without being limited to the example stated above, a focused ion beam processing machine may also have the structure wherein processing with an ion beam and observation of the surface are conducted simultaneously, and images of a plane that is in parallel with the surface of base member A are acquired in succession to accumulate them as three-dimensional image data and to obtain optional section through image conversion.

(Electron Beam Drawing Device)

(Explanation of Structure)

The schematic structure of an entire electron beam drawing apparatus will be explained as follows, referring to FIG. 10. FIG. 10 is an illustration showing the whole structure of an electron beam drawing apparatus in the present example.

As shown in FIG. 10, electron beam drawing apparatus 401 is an apparatus for forming an electron beam probe of high resolution with a high-current and for scanning at high speed on base member A to be drawn thereon, and it is composed of electron gun 412 representing an electron beam generating means that forms an electron beam probe at high resolution and generates electron beam and irradiates beam on a target, slit 414 through which the electron beam from the electron gun 412 passes, electronic lens 416 for controlling a focal point of the electron beam passing through the slit 414 for the base member A, aperture 418 for creating a desired beam shape of electron beam by an opening provided on a path where the electron beam is emitted, deflector 420 that controls a scanning position on the base member A by deflecting the electron beam and coil 422 for correction that corrects deflection. Incidentally, each of the foregoing components is arranged in lens-barrel 410, and is maintained to be vacuous when an electron beam is emitted.

Further, electron beam drawing apparatus 401 is composed of XYZ stage 430 representing a table on which base member A to be drawn thereon is placed, loader 440 representing a conveyance means for conveying base member A to a placing position on the XYZ stage 430, measuring instrument 480 representing a measuring means for measuring a reference point on the surface of base member A on the XYZ stage 430, stage driving means 450 representing a driving means for driving the XYZ stage 430, loader driving device 460 for driving a loader, evacuation apparatus 470 to evacuate the lens-barrel 410 and casing 411 including the XYZ stage 430 to make them to be vacuous, observation system 491 for observing the top face of base member A, and control section (circuit) 492, which represents a control means to control the foregoing.

Incidentally, with regard to electronic lens 416, a plurality of electronic lenses are generated by plural coils 417a, 417b and 417c provided to be away from each other at plural locations in the vertical direction, and each of the electronic lenses is controlled by a value of an electric current of each of the coils, thus, a focal position of the electron beam is controlled.

The measuring instrument 480 is composed of first laser length measuring machine 482 that measures base member A by irradiating base member A with a laser, first light receiving section 484 that receives a laser beam (first irradiation light) which is emitted from the first laser length measuring machine 482 and is reflected on the base member A, second laser length measuring machine 486 that irradiates at an irradiation angle that is different from the first laser length measuring machine 482, and second light receiving section 488 that receives a laser beam (second irradiation light) which is emitted from the second laser length measuring machine 486 and is reflected on the base member A.

The stage driving means 450 is composed of X-direction driving mechanism 452 that drives the XYZ stage 430 in the X-direction, Y-direction driving mechanism 454 that drives the XYZ stage 430 in the Y-direction, Z-direction driving mechanism 456 that drives the XYZ stage 430 in the Z-direction, and θ-direction driving mechanism 458 that drives the XYZ stage 430 in the θ-direction. Owing to this, it is possible to make the XYZ stage 430 to operate on a three-dimensional basis and to conduct alignment.

Incidentally, the control circuit 492 is composed of an electron gun power source section that supplies electric power to electron gun 412, an electron gun control section that adjusts and controls electric current and voltage in the electron gun power source section, a lens power source section that operates electronic lens 416 (each of plural electronic lenses) and a lens control section that adjusts and controls each electric current corresponding to each electronic lens in the lens power source section, which are not shown.

The control circuit 492 is further composed of a coil control section for controlling coil 422 for correction, a form deflecting section that deflects the form direction by deflector 420, a sub-deflecting section that deflects the sub-scanning direction by deflector 420, a main-deflecting section that deflects the main scanning direction by deflector 420, an electric field control circuit representing an electric field control means that controls an electric field of an electron beam, a pattern generating circuit for generating a drawing pattern for the base member A, various laser control systems, a stage control circuit for controlling stage driving means 450, a loader control circuit for controlling loader driving device 460, a measurement information inputting section for inputting measurement information, a memory representing a storage means for storing inputted information and other plural pieces of information, a program memory in which control programs for conducting various controls are stored, a control system equipped with respective sections, and a control section formed by, for example, CPU which controls respective sections stated above.

(Explanation of Operations)

In electron beam drawing device 401 having the aforesaid structure, when base member A conveyed by loader 440 is placed on XYZ stage 430, electron gun 412 radiates an electron beam, after air and dust in lens-barrel 410 and casing 411 are exhausted by evacuation apparatus 470.

The electron beam radiated from the electron gun 412 is deflected by deflector 420 through electronic lens 416, and the deflected electron beam B (hereinafter, a symbol of "electron beam B" may be given to only the electron beam deflected and controlled after passing through the electronic lens 416) is irradiated on the surface of base member A on XYZ stage 430, for example, on the position for drawing on curved surface section (curved surface) 12, thus, drawing is conducted.

In this case, the drawing position (at least a position in height among drawing positions) on base member A, or the position of the reference point described later is measured by measuring instrument 480, and control circuit 492 adjusts and controls each value of electric current flowing through coils 417a, 417b and 417c of electronic lens 416 based on results of the aforesaid measurement, and thereby, controls a position of a depth of focus of electron beam B, namely, a position of the focus, thus, the position of the focus is controlled to be moved so that it may result in the drawing position mentioned above.

Or, based on the results of the measurement, the control circuit 492 moves XYZ stage 430 by controlling stage driving means 450 so that a position of focus of electron beam B may result in the drawing position mentioned above.

Further, in the present example, it is possible to conduct by using either one or both of the control of the electron beam and the control of XYZ stage 430.

First light beam S1 is irradiated on base member A in the direction to intersect the electron beam from first laser length measuring machine 482 of the measuring instrument 480, and first light intensity distribution is detected when first light beam S1 passing through the base member A is received.

In this case, a position (in height) on a flat portion of the base member A is measured and calculated based on the first intensity distribution, because the first light beam S1 is reflected on the bottom portion of the base member A. In this case, however, a position (in height) on base optical surface 10 of the base member A cannot be measured.

In the present example, therefore, second laser length measuring machine 486 is further provided. Namely, second light beam S2 that is different from the first light beam S1 is irradiated on base member A in the direction intersecting the electron beam approximately at right angles from second laser length measuring machine 486, and second light intensity distribution is detected when second light beam S2 passing through the base member A is received, and based on this, the position is measured and calculated.

Then, a position of focus of the electron beam is adjusted with this position of the base member A estimated, for example, as a drawing position.

The invention has been explained as described above, referring to the embodiments to which, however, the invention is not limited in terms of interpretation, and it is naturally possible to make changes and improvements (including a combination of embodiments).

In the invention, it is possible to provide a producing method for a high-precision and easy optical element molding die and a producing method for an optical element formed by the optical element molding die, by securing the reference for processing.

What is claimed is:

1. A method of producing an optical element forming die, comprising:
    (a) cutting a base member to form a base optical surface thereof while rotating the base member;
    (b) cutting an outer circumferential surface of the base member so that an optical axis of the base optical surface is identical to a rotation center of the outer circumferential surface of the base member while rotating the base member;
    (c) forming an optical surface having a predetermined pattern onto the base optical surface of the base member;
    (d) forming, by electroforming conducted with the base member, an electroforming mold having an optical transfer surface complementary to the optical surface having the predetermined pattern on the base member; and
    (e) cutting an outer circumferential surface of the electroforming mold on the basis of the outer circumferential surface of the base member so that the optical axis of the base optical surface is identical to a rotational center of the electroforming mold while rotating the electroforming mold together with the base member to obtain the optical element forming die having the optical transfer surface.

2. The method of claim 1, wherein the step of forming of the optical surface having the predetermined pattern comprises forming a resist layer on the base optical surface, drawing a ring-shaped pattern on the resist layer by radiating an electronic beam, and conducting development processing to form an optical surface having the ring-shaped pattern onto the base optical surface, said ring-shaped pattern being the predetermined pattern.

3. The method of claim 1, wherein the step of cutting the outer circumferential surface of the electroforming mold is carried out while the base member is integrally formed with the electroforming mold.

4. The method of claim 3, wherein the step of cutting the outer circumferential surface of the electroforming mold is carried out after mounting the base member to a lathe so that a rotary axis of the lathe and an optical axis of the base member coincide with each other.

5. The method of claim 1, wherein the base member includes an electrode member, and an insulating material is provided on an outer circumferential surface of the electrode member.

6. The method of claim 1, wherein the steps of forming the base optical surface on the base member and cutting the outer circumferential surface of the base member are carried out simultaneously.

7. The method of claim 1, wherein the base member is obtained by fixing a base material to an electrode member.

8. The method of claim 7, wherein the base optical surface is formed by cutting the base material.

9. The method of claim 1, wherein the base member is obtained by making a layer of base material on an electrode member.

10. A method of producing an optical element forming die, comprising:
    (a) mounting a base member on a first lathe;
    (b) cutting the base member to form a base optical surface thereof while rotating the base member on the first lathe;
    (c) cutting an outer circumferential surface of the base member so that an optical axis of the base optical surface is identical to a rotation center of the outer circumferential surface of the base member while rotating the base member on the first lathe;
    (d) removing the base member from the lathe;
    (e) forming a resist layer on the base optical surface of the base member;
    (f) drawing a predetermined pattern on the resist layer by radiating an electronic beam;
    (g) conducting development processing to form an optical surface having the predetermined pattern onto the base optical surface of the base member;
    (h) forming, by electroforming conducted with the base member, an electroforming mold having an optical transfer surface complementary to the optical surface having the predetermined pattern on the base member;
    (i) mounting the base member and the electroforming mold on a second lathe;
    (j) cutting an outer circumferential surface of the electroforming mold on the basis of the outer circumferential surface of the base member so that the optical axis of the base optical surface is identical to a rotational center of the electroforming mold while rotating the electroforming mold together with the base member on the second lathe; and
    (k) separating the electroforming mold from the base member to obtain the optical element forming die, which has the optical transfer surface.

11. The method of claim 10, wherein the step of cutting the outer circumferential surface of the electroforming mold is carried out, while the base member is integrally formed with the electroforming mold.

12. The method of claim 10, further comprising:
    combining the electroforming mold and a supporting member; and
    cutting an outer circumferential surface of the supporting member on the basis of the outer circumferential surface of the base member so that the optical axis of the base optical surface is identical to a rotational center of the supporting member, while rotating the electroforming mold, the supporting member, and the base member.

13. The method of claim 10, wherein the first lathe is the same as the second lathe.

14. The method of claim 10, wherein the predetermined pattern is a ring-shaped pattern.

15. A method of producing an optical element forming die, comprising:
    (a) cutting a base member to form a base optical surface thereof while rotating the base member;
    (b) cutting an outer circumferential surface of the base member so that an optical axis of the base optical surface is identical to a rotation center of the outer circumferential surface of the base member while rotating the base member;
    (c) forming an optical surface having a predetermined pattern onto the base optical surface;

(d) forming, by electroforming conducted with the base member, an electroforming mold having an optical transfer surface complementary to the optical surface having the predetermined pattern on the base members;
(e) combining a supporting member with the electroforming mold;
(f) cutting an outer circumferential surface of the supporting member on the basis of the outer circumferential surface of the base member so that the optical axis of the base optical surface is identical to a rotational center of the supporting member while rotating the supporting member and the base member; and
(g) separating the electroforming mold from the base member to obtain the optical element forming die, which has the optical transfer surface.

16. The method of claim 15, wherein the step of cutting the outer circumferential surface of the supporting member is carried out on the basis of the outer circumferential surface of the base member, while the base member is integrally formed with the electroforming mold.

17. The method of claim 16, wherein the step of cutting the outer circumferential surface of the supporting member is carried out after mounting the base member to a lathe so that a rotary axis of the lathe and an optical axis of the base member coincide with each other.

18. The method of claim 15, wherein the supporting member includes a sliding member, and an outer surface of the sliding member is cut in the step of cutting the outer circumferential surface of the supporting member on the basis of the outer surface of the base member.

* * * * *